United States Patent [19]

Maehara

[11] Patent Number: 5,067,881
[45] Date of Patent: Nov. 26, 1991

[54] PLUNGER-OPERATED HYDRAULIC PUMP

[75] Inventor: Toshifumi Maehara, Saitama, Japan

[73] Assignees: Akebono Brake Industry Co., Ltd., Tokyo; Akebono Research and Development Center Ltd., Hanyu, both of Japan

[21] Appl. No.: 524,021

[22] Filed: May 16, 1990

[30] Foreign Application Priority Data

May 17, 1989 [JP] Japan .................................. 1-123645
May 25, 1989 [JP] Japan .................................. 1-130263

[51] Int. Cl.$^5$ .............................................. F04B 7/04
[52] U.S. Cl. ..................................... 417/498; 417/554
[58] Field of Search ............... 417/498, 514, 552, 554, 417/273

[56] References Cited

FOREIGN PATENT DOCUMENTS 2554783 6/1977 Fed. Rep. of Germany ...... 417/273

Primary Examiner—Richard A. Bertsch
Assistant Examiner—Charles Freay
Attorney, Agent, or Firm—Cushman, Darby & Cushman

[57] ABSTRACT

In a plunger-operated hydraulic pump, a cylinder has an ejection port extending from its upper end portion with an ejection valve provided at the ejection port. A piston and a plunger fitted in the cylinder are urged towards an eccentric cam by a first return spring and a second return spring which is stronger than the first return spring, respectively. The cylinder has a suction port in its lower end portion in such a manner that it is not closed by the plunger, so that the suction valve is opened by the downward stroke of the plunger, and during suction, the inflow resistance of the suction valve is minimized. Further, in the hydraulic pump, a plurality of cylinders are arranged at equal angular intervals so that the vibrations due to the reciprocations of the plungers are canceled by one another, thereby greatly suppressing the vibration of the cylinder block.

7 Claims, 4 Drawing Sheets

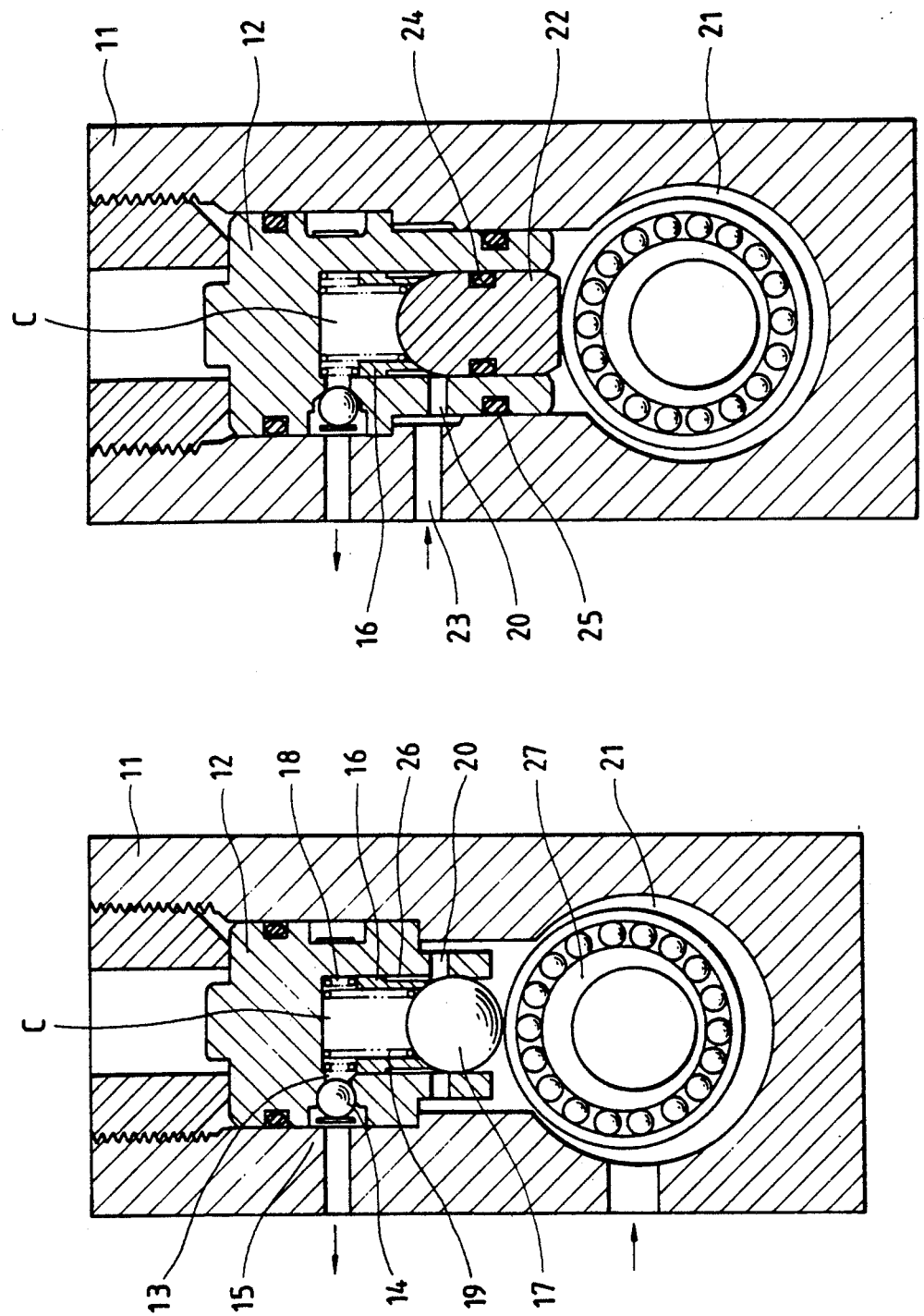

5,067,881

1

PLUNGER-OPERATED HYDRAULIC PUMP

BACKGROUND OF THE INVENTION

This invention relates to a small hydraulic pump with a plunger driven by an eccentric cam, and more particularly to an improvement of the small hydraulic pump.

There are provided various plungers, cylinders, supply valves and discharge valves for a small hydraulic pump of this type. Recently, a small hydraulic pump, which is effective in miniaturization of a hydraulic pump, and in improvement of the pumping efficiency thereof, has been disclosed by Japanese Utility Patent Application (OPI) No. 79477/2988 (the term "OPI" as used herein means an "unexamined published application").

One example of the small hydraulic pump will be described with reference to FIG. 1 (Prior Art).

In the hydraulic pump, a plunger 4 is driven by a bearing 3 fitted on an eccentric cam 2 on a drive shaft 1. A suction valve comprises a ball valve 5 positioned in the upper end portion of a cylinder, and a spring 6 urging the ball valve 5 so as to close the suction valve. An ejection valve is made up of a ball valve 8 set in an ejection port, and a spring 9 urging the ball valve 8 so as to close the ejection valve.

When the plunger is moved downwardly, the ball valve 5 is moved downwardly against the spring 6 by the negative pressure in the cylinder, opening the suction valve. As a result, operating oil is sucked into the cylinder through a suction port 10. When the plunger is moved upwardly, the ejection valve is opened by the pressure in the cylinder, so that the high pressure oil is discharged from the cylinder through the ejection port.

In the hydraulic pump, the negative pressure in the cylinder moves the ball valve 5 against the valve closing force of the spring 6 to suck the operating oil into the cylinder, and therefore, the inflow resistance is high and the negative pressure in the cylinder is also high. Hence, suction of the operating oil is not smooth and gas is released from the operating oil. As the plunger is moved upwardly, the pressure in the cylinder is increased, so that the gas thus released is dissolved into the operating oil, with the result that the pumping efficiency is decreased accordingly.

Another example of the conventional small hydraulic pump will be described with reference to FIG. 2 (Prior Art).

In the hydraulic pump, a plunger 33 is driven by a bearing fitted on an eccentric cam 32 which is fixedly mounted on a pump shaft 31. An ejection valve comprises a ball valve 34 positioned in the upper end portion of a cylinder, and a spring 35 urging the ball valve 34 to close the ejection valve. A suction valve comprises a ball valve 37 set in a suction port 36, and a spring 38 urging the ball valve 37 to close the suction valve.

When the plunger 33 is moved downwardly, the ball valve 37 is pulled upwardly by the negative pressure in the cylinder against the elastic force of the spring 38, opening the suction valve. As a result, operating oil is sucked into the pressurizing chamber P of the cylinder through the suction port 36. When the plunger 33 is moved upwardly, the ejection valve is opened by the pressure in the cylinder, so that the high pressure oil is discharged from the pressurizing chamber P through the ejection port d.

In the hydraulic pump described above, the drive shaft is vibrated by the high speed rotation of the eccentric cam 32, and the vibration is transmitted to the cylinder block B. Furthermore, the pressure in the cylinder changes at high frequency so that the cylinder block B vibrates. In addition, the ball valves are moved to and from the valve seats at high frequency, also causing the cylinder block B to vibrate. Since the cylinder block B is fixed directly to the pump housing H, the vibration of the cylinder block B is transmitted directly to the pump housing H, thus vibrating equipment related to the hydraulic pump, or producing vibrational sounds.

SUMMARY OF THE INVENTION

Accordingly, an object of this invention is to eliminate the above-describe difficulties accompanying a conventional plunger-operated hydraulic pump.

More specifically, a first object of the invention is to provide a plunger-operated hydraulic pump in which the suction valve is opened by the downward stroke of the plunger, and the suction valve is maximized in inflow section so that, during suction, the inflow resistance of the suction valve is minimized.

The foregoing objects of the invention have been achieved by the provision of a plunger-operated hydraulic pump in which (a) an ejection port is extended from the upper end portion of a cylinder and is provided with an ejection valve, (b) a hollow cylinder-shaped piston is fitted in the cylinder, and a plunger is also fitted in the cylinder such that it is located below the piston, (c) the piston is urged towards an eccentric cam by a first return spring, while the plunger is also urged towards the eccentric cam by a second return spring, (d) the second return spring is higher in elastic force than the first return spring, and (e) a suction port is formed in the side wall of the cylinder such that it is not closed by the plunger.

As the plunger is pushed upwardly by the eccentric cam, the upper end face of the plunger abuts against the lower end face of the piston, as a result of which the space (or pump chamber) defined by the hollow cylinder-shaped piston, the plunger and the inner wall of the cylinder is sealingly closed. Under this condition, the plunger and the piston are raised against the elastic forces of the return springs. As a result, the operating oil is discharged from the pump chamber through the ejection port. Even when the plunger reaches the top dead centre, the suction port formed in the lower end portion of the side wall of the cylinder is not closed by the plunger, thus being communicated with the cylinder.

When the piston is moved downwardly, the plunger is moved downwardly past the suction port. In this case, the suction port can be maintained in communication with the cylinder, for instance, by making a portion of the outside diameter of the plunger smaller than the inside diameter of the cylinder.

The eccentric cam is rotated at high speed. In the downward stroke of the eccentric cam, the plunger will follow the eccentric cam smoothly because it is urged by the strong spring. On the other hand, the piston is urged by the weak spring, and therefore, it cannot sufficiently follow the downward stroke of the eccentric cam because of the relationships between the inertia of the piston, the frictional resistance of the piston and the cylinder, and the elastic forces of the springs. Thus, the piston follows the downward stroke of the eccentric cam with slight delay and the piston is moved downwardly somewhat later than the plunger. As a result, in the downward stroke, the piston is spaced away from the plunger, thus providing a gap therebetween. Through the gap thus formed, the suction port communicates with the pump chamber. Hence, in the downward stroke, the operating oil flows from the suction port into the pump chamber through the inflow path which has been formed between the plunger and the piston. The gap between the piston and the plunger is narrow, but large in sectional area (the gap being in the form of a ring whose diameter is somewhat smaller than the inside diameter of the cylinder). Therefore, the inflow resistance of the gap is much lower than that of the check valve or ball valve of the conventional devices.

The speed of downward movement of the plunger is substantially zero when the eccentric cam reaches the bottom dead center to start the upward stroke. Hence, during this period, the piston overtakes the plunger so that the lower end of the piston abuts against the upper end of the plunger, whereby the pump chamber is sealingly closed again. The plunger and the piston are pushed upwardly by the upward stroke of the eccentric cam.

A second object of the invention is to provide a plunger-operated hydraulic pump in which transmission of the vibration of the cylinder block to the pump housing is suppressed during operation.

This object has been achieved by the provision of a plunger-operated hydraulic pump in which (a) a cylinder block in the form of a cylinder, which is coaxial with a pump shaft, is fitted in a pump housing using elastic seal rings, (b) cylinders are formed in the cylinder block in such a manner that the cylinders extend radially through the cylinder block, (c) an annular pressure oil chamber is formed between the outer cylindrical wall of the cylinder block and the inner cylindrical wall of the pump housing, the annular pressure oil chamber being sealed with the elastic seal rings, (d) the annular pressure oil chamber communicates with the cylinders through the respective ejection valves and communicates with an ejection port at all times, and (e) the cylinder block supports the pump shaft.

In the hydraulic pump, each cylinder performs one suction and discharge operation per revolution of the pump shaft. The operating oil ejected from the cylinders is discharged through the annular pressure oil chamber and the ejection port.

The cylinder block is supported by the pressure of the operating oil in the oil pressure chamber in such a manner that it floats with respect to the pump housing. Hence, even if the pump shaft is vibrated, or vibration is caused by the reciprocation of the plungers, the vibration is absorbed by the operating oil in the annular pressure oil chamber and is only minimally transmitted to the pump housing.

The cylinder block is so designed that it is free from the rotation of the pump driving shaft. In the case of a small plunger-operated hydraulic pump, the frictional engagement of the elastic seal rings with the pump housing can sufficiently prevent the rotation of the cylinder block.

In the hydraulic pump, the cylinder block has two or more cylinders which are arranged at equal angular intervals. Hence, the vibrations caused by the reciprocations of the plungers are canceled by one another, so that the vibration of the cylinder block is greatly suppressed.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

BRIEF DESCRIPTION OF THE DRAWINGS

FIG. 3 is a sectional view showing a first example of a plunger-operated hydraulic pump according to the invention;

FIG. 4 is a sectional view showing a second example of the plunger-operated hydraulic pump according to the invention;

DETAILED DESCRIPTION OF THE PREFERRED EMBODIMENTS

Figure 1:
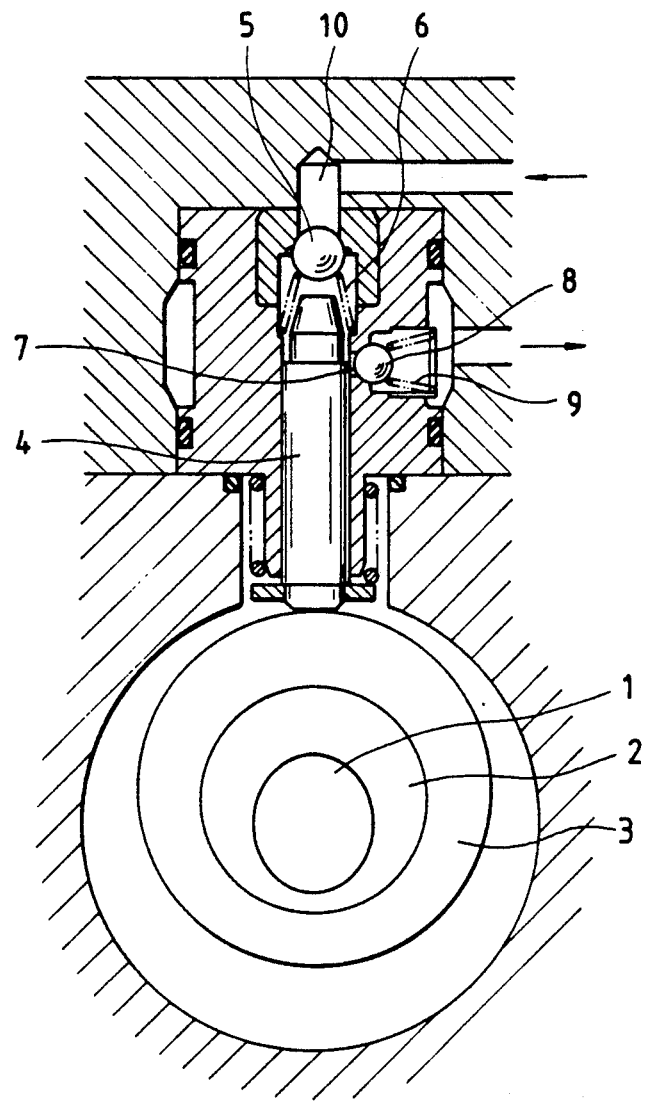
FIG. 1 (Prior Art) is a sectional diagram showing one example of a conventional small plunger-operated hydraulic pump.
Figure 2:
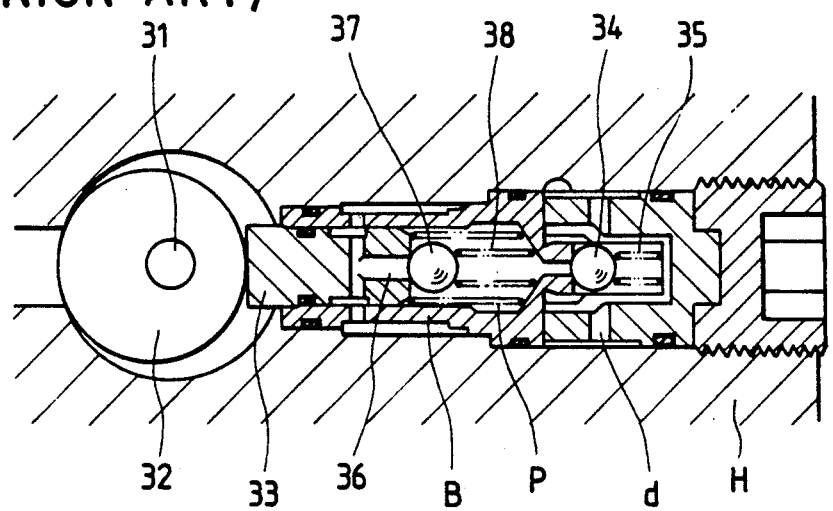
FIG. 2 (Prior Art) is a sectional diagram showing another example of a conventional small plunger-operated hydraulic pump.

A first embodiment of a plunger-operated hydraulic pump according to the invention will be described with reference to FIG. 3.

In the hydraulic pump, a cylinder block 12 is fitted in a pump casing 11, and an ejection valve 15 comprises an ejection port 13 formed in the side wall of the cylinder block 12 in such a manner as to communicate with a cylinder 26 thereof, and an ejection valve 15 set in the ejection port 13.

A hollow cylinder-shaped piston 16 is fitted in the cylinder 26, in such a manner as to engage with a ball-shaped plunger 17. The lower end face of the piston 16 is inwardly curved, so that it is in close contact with the surface of the plunger 17. The piston 16 is urged towards an eccentric cam by a relatively weak return spring 18, and the plunger 17 is also urged towards the eccentric cam 27 by a relatively weak return spring 19.

A suction port 20 is formed in the lower end portion of the cylinder block 12 in such a manner that, even when the plunger 17 is moved to the top dead centre, it is not closed by the plunger 17. In this embodiment, the suction port 20 communicates with an eccentric cam chamber 21 so that operating oil flows into the suction port 20 through the eccentric cam chamber 21.

FIG. 3 shows the eccentric cam 27 positioned at top dead center, and the operation of discharging operating oil from the pump chamber C has been accomplished. When, under this condition, the downward stroke of the eccentric cam 27 is effected, the plunger 17 is disengaged from the lower end of the piston 16 because the plunger 17 is moved faster than the piston 16. As a result, a gap is formed between the plunger 17 and the lower end of the piston 16, so that the suction port 20 communicates through the gap with the pump chamber C, and the operating oil flows into the pump chamber C as the plunger 17 and the piston 16 move downwardly.

At some point near bottom dead center of the eccentric cam 27, which can be before or after bottom dead center depending on design considerations, the piston 16 reaches the plunger 17, so that the lower end of the piston 16 is brought into close contact with the plunger 17, thus closing the pump chamber C.

A second embodiment of the invention will be described with reference to FIG. 4.

The second embodiment is different from the first embodiment shown in FIG. 3 only in that its plunger 22 is in the form of a column, and a suction port 20 formed in a cylinder block 12 does not communicate with an eccentric cam chamber 21, but communicates directly with a suction port 23 formed in the pump casing 11. The operation of the second embodiment is the same as that of the first embodiment shown in FIG. 3.

In order to prevent the leakage of operating oil from the pump chamber C into the eccentric cam chamber 21 through the gap between the plunger 22 and the cylinder block 12, a sealing ring 24 is fitted on the plunger 22. Furthermore, in order to prevent the leakage of operating oil into the eccentric cam chamber 21 through the gap between the cylinder block 12 and the pump casing 11, a sealing ring 25 is fitted on the lower end portion of the cylinder block 12. In order to bring the plunger 22 and the piston 16 into close contact with each other, the upper end face of the plunger 22 is curved outwardly, and the lower end face of the piston 16 is curved inwardly.

The problem to be solved by the invention is novel, and therefore, the fact that the problem has been solved by the invention is itself a great effect of the invention. In addition, in the hydraulic pump according to the invention, the plunger serves also as a suction valve That is, a suction valve is eliminated from the hydraulic pump according to the invention, with results in a simpler and smaller hydraulic pump.

Figure 5:
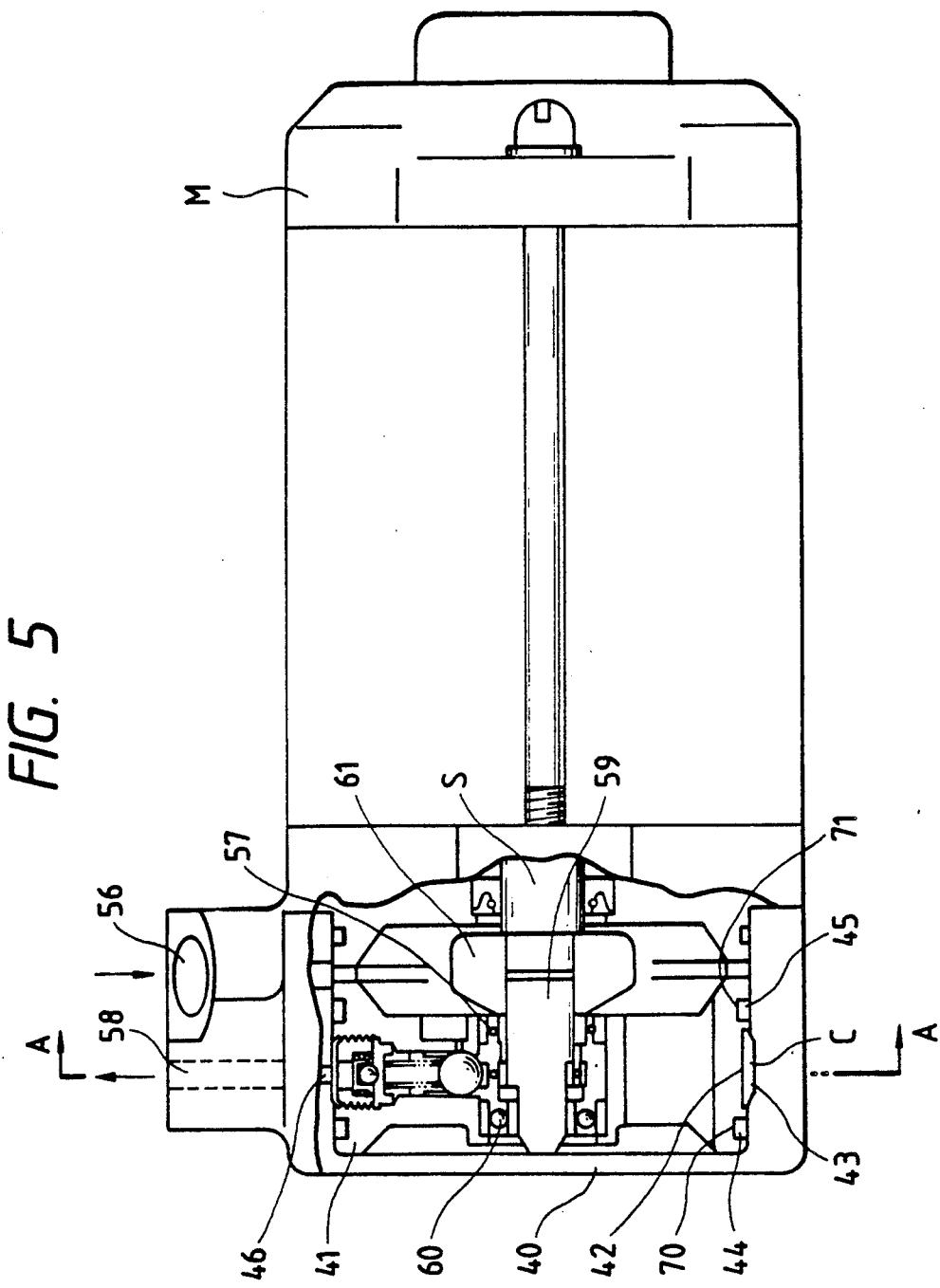
FIG. 5 is a sectional side view showing a third example of the plunger-operated hydraulic pump according to the invention.
Figure 6:
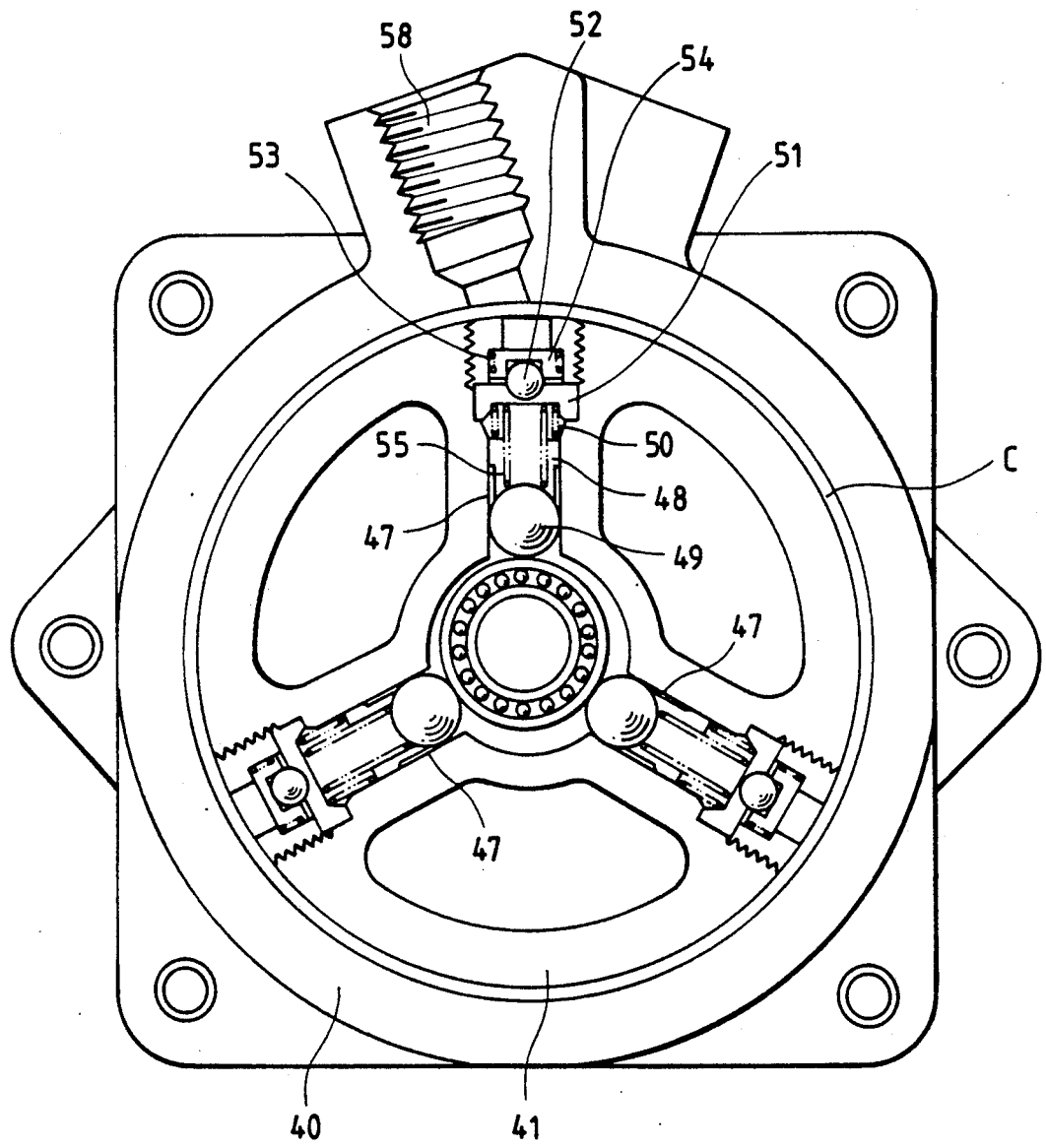
FIG. 6 is a sectional view taken along line A-A in FIG. 5.

A third embodiment of the invention will be described with reference to FIGS. 5 and 6.

A cylinder block 41 is loosely fitted in a pump housing 40, and an annular oil pressure chamber C is formed by a middle annular groove 42 formed in the outer cylindrical wall of the cylinder block 41 and an annular groove 43 formed in the inner cylindrical wall of the pump housing 40. Two annular grooves 70 and 71 are additionally formed on both sides of the middle annular groove 42 and 0-rings 44 and 45 are fitted, respectively, in the annular grooves thus formed. The 0-rings 44 and 45 are press-fitted into the pump housing 40 to seal the annular oil pressure chamber C. The annular oil pressure chamber C communicates with an ejection port 46 at all times.

Three cylinders 47 are radially arranged in the cylinder block 41. Each of the cylinders 47 comprises a piston 48 as described above with reference to the first embodiment piston 48, a plunger 49, which in this embodiment is in the form of a ball and a return spring 50, thus forming a plunger pump.

In the pump, the plunger 49 is the cam follower and serves as a suction valve in correlation with the piston 48. The piston 48 serves as a valve seal for the suction valve. When the plunger 49 is moved away from the lower end of the piston 48, operating oil is allowed to flow into the pressurizing chamber of the cylinder 47 through the central hole of the piston 48. An ejection valve is provided at the outer end of the cylinder 47.

The ejection valve comprises a valve seat 51, a ball 52, a spring 53, and an elastic sheet 54. All the ejection valves communicate with the annular pressure oil chamber C.

A suction spring 55 pushes the plunger 49 during the downward stroke of the plunger 49 so that it is disengaged from the lower end of the piston 48, providing a gap therebetween. The operating oil sucked in through a suction port 56 formed in the pump housing 40 flows into the eccentric cam chamber through a bearing 57, and into the pressurizing chamber of the cylinder 47 through the gap between the plunger 49 and the lower end of the piston 48.

In the upward stroke of the plunger 49, the plunger 49 abuts against the lower end of the piston 48 to push the piston 48 upwardly against the elastic force of the return spring 50, opening the ejection valve comprising ball 52. Thus, the pressurized oil is allowed to flow into the annular oil pressure chamber C, and to flow through an ejection port 58 into an accumulator.

A pump shaft 59 is supported by the cylinder block 41 through the bearing 57 and a bearing 60, and is coupled through a coupling 61 to the shaft S of an electric motor M.

The three plungers repeat the suction and ejection strokes with a phase difference of 120°. The directions of vibration of the three plungers are different from one another by 120°. Thus, the vibrations of the cylinder block due to the movements of the plungers are partially canceled by one another, so that the vibration of the cylinder block is reduced as much.

The cylinder block 41 is somewhat vibrated by the pump shaft for instance. However, since the cylinder block 41 is supported by the pump housing 40 through the pressurized oil layer in the annular oil pressure chamber C, it is supported in a floating mode. Thus, the vibration, being absorbed by the pressurized oil layer in the annular oil pressure chamber, is only minimally transmitted to the pump housing 40. In the above-described hydraulic pump, the seal rings 44 and 45 may be so-called oil seals such as 0-rings, or U-packings.

The second problem to be solved by the invention is novel. Therefore, the fact should be highly appreciated that, in a small plunger-operated hydraulic pump, the vibrations and accordingly the vibrational sounds of its components due to the vibrations of the plungers can be greatly reduced according to the invention.

The cylinder block 41 may be combined with the plungers, discharge valves, suction valves, etc. to form a subassembly. In this case, the assembling work of the hydraulic pump can be readily and efficiently achieved by combining the subassembly with the pump housing 40. Furthermore, since the cylinder block is separated from the pump housing 40, a multi-cylinder type hydraulic pump can be readily realized according to the invention.

While the invention has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A plunger operated hydraulic pump comprising:
   a pump housing;

a cylinder block in the form of a cylinder which is coaxial with a pump shaft, said cylinder block being fitted in a pump housing using elastic seal rings, and having at least two cylinders which are formed therein in such a manner that said cylinders extend radially through said cylinder block;

a piston in the form of a hollow cylinder fitted in each said cylinder;

a plunger fitted in each cylinder in such a manner that each plunger is located below each piston;

a first return spring provided in said cylinder to urge each piston towards an eccentric cam;

a second return spring provided in each cylinder to urge said plunger towards said eccentric cam, each second return spring having a larger elastic force than each first return spring; and an annular oil pressure chamber formed between the outer cylindrical wall of said cylinder block and the inner cylindrical wall of said pump housing, said annular oil pressure chamber being sealed with said elastic seal rings, said annular oil pressure chamber communicating with said cylinders through ejection valves and communicating with an ejection port at all times, said pump shaft being supported by said cylinder block.

2. A plunger operated hydraulic pump as claimed in claim 1, in which said cylinder block has a plurality of cylinders arranged at equal angular intervals.

3. A plunger operated hydraulic pump as claimed in claim 1, wherein said plunger is in the form of a ball.

4. A small plunger-operated hydraulic pump comprising:

a cylinder having an ejection port which extends from the upper end portion of said cylinder;

an ejection valve provided at said ejection port;

a piston in the form of a hollow cylinder fitted in said cylinder;

a plunger fitted in said cylinder in such a manner that said plunger is located below said piston;

a first return spring provided in said cylinder to urge said piston towards an eccentric cam; and a second return spring provided in said cylinder to urge said plunger towards said eccentric cam, said second return spring having a larger elastic force than said first return spring, said cylinder having a suction port formed in the lower end portion of a side wall thereof in such a manner that said suction port is not closed by said plunger.

5. A small plunger-operated hydraulic pump as claimed in claim 4, wherein said plunger is in the form of a ball.

6. A small plunger-operated hydraulic pump as claimed in claim 5, wherein said suction port communicates with an eccentric cam chamber.

7. A small plunger-operated hydraulic pump as claimed in claim 4, wherein said plunger is in the form of a cylinder, a top end of which is spherical.

* * * * *